Patented Dec. 30, 1930

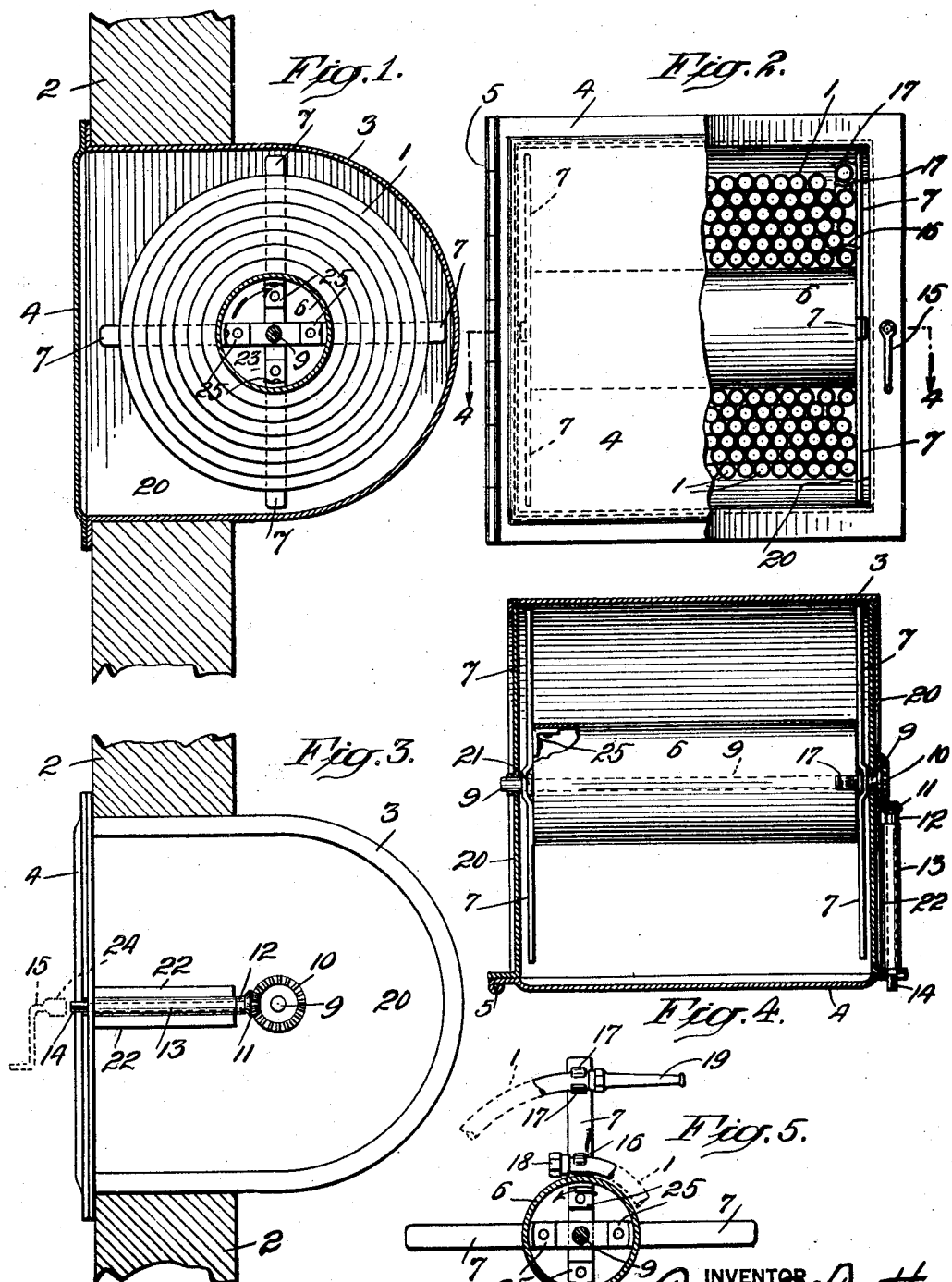

1,787,194

UNITED STATES PATENT OFFICE

RICHARD T. FREETH, OF HEMPSTEAD, NEW YORK

STATIONARY HOSE REEL

Application filed January 5, 1928, Serial No. 244,604. Renewed May 22, 1930.

My present invention refers to a hose reel of a stationary type, that is built into and forms a part of the foundation structure of a building, or a part of some other portion of the building, the same having a casing or boxing which is adapted to be cemented or otherwise secured in the portion of the foundation which rises above the ground, being somewhat analogous therefore in respect to its location and setting to a cellar window.

The object is to provide safe and protective storage for a hose of the garden variety after it is wound upon its reel, so that the reel and hose may be readily housed at all times when not in use, and the hose may thus be kept from deterioration from the weather and neglect. Houses, especially dwellings having gardens or lawns, require the daily use of sprinkling or watering means, which is commonly provided in the form of a hose; and a reel, generally portable, is employed to wind the hose into a small compass when it is not in use. A good deal of labor is involved in reeling up the hose pipe and in unreeling it, and in moving the reel under cover and out therefrom. So I provide the wall of the house adjoining the garden or lawn with a casing set firmly in such wall, in which casing the reel is mounted, and it is provided with manual rotating means whereby the reel may be rotated to wind the hose thereon after use, or to unwind it when it is to be again used. Thus the hose pipe is quickly put away, and easily delivered for use again at any time; much labor of handling is avoided, and the hose is always kept stored in a safe spot when it is not needed. The life of a hose thus cared for is greatly prolonged.

With these and various other objects and purposes in view, and with the same and other correlative observations regarding the aim and structure of the device, it may be remarked that the invention consists essentially in the construction, combination, and arrangement of parts, substantially as will be hereinafter described and claimed.

In the accompanying drawing illustrating my invention:

Figure 1 is a vertical sectional view of the chamber of my device, set firmly in a wall, and showing an end view of the reel therein with the hose pipe wound completely thereon, the door of the chamber being shut.

Figure 2 is a front elevation, with a part of the door broken away to expose the inner reel and hose, the latter being indicated in section to show how the ends are secured and how the hose reels up on the drum in concentric layers.

Figure 3 is an outer side elevation of the chamber, and indicates particularly the drum-rotating gear mechanism.

Figure 4 is a horizontal sectional plan on the line 4, 4, of Figure 2.

Figure 5 is an enlarged detail of the drum, which is in section, and its arms, to show the clamping means for holding the ends of the hose.

Similar characters of reference denote like parts through all the different figures of the drawing.

1 denotes any ordinary specimen of rubber garden hose, or any other kind of piping. The same may have any length or diameter, and be of any material.

The wall 2 of a building is shown for explanatory reasons, and may be a concrete form or a mass of bricks or blocks, the same being a part of the cellar foundation that rises above the ground level. In this wall I place a permanent chamber or casing 3, having a front door, hinged at 5. This casing 3 may be of any size and shape. It will be convenient of access, and will be in proximity to the lawn or other area where the hose is chiefly used. It probably will be somewhat analogous in height, location, and outer form, to a cellar window frame.

The chamber 3 is given merely by way of example. Its rear or back, which is on the inside of wall 2, is preferably curved to correspond generally to the curvature of the reel so that the depth of the chamber from front to rear will be considerably more than the thickness of wall 2. This neat and roomy chamber 3 moreover has parallel vertical sides 20, in which the reeling means is mounted.

The reeling means consists of a horizontal drum 6, having any desirable diameter. The ends of drum 6 may be closed or not with metal discs. I show them open. At each end of drum 6 is a plurality of radial arms 7. Each pair of arms is made from a single strip, and as I usually have four such arms, there are two strips which cross each other at their center and at the center of the ends of the drum, at points 21, where bearings are formed at these junctions, to fixedly hold the shaft 9, whose ends form journals on which the drum 6 revolves, said journals being revolvable in bearings in sides 20 in which they are mounted. The arms 7 at the central points where they cross each other may be soldered or otherwise secured together to form hubs that are sufficiently substantial. Also the arms may be soldered to the drum ends in any desired manner, as for example angle pieces 25 may be riveted or soldered to arms 7 and also to inside of drum 6 so as to make a tight and rigid connection; but obviously the arms 7 that serve as guides at ends of drum 6 so that the hose 1 may wind on drum in coils between arms 7 without going off the ends of the drum may be secured to the drum in any preferred and efficient way.

It is essential to provide means for attaching the ends of the hose to the reel so that the hose will stay in place during the winding and after it is finished. One end of the hose is usually provided with a loose rotatable screw coupling 18 by which it can be attached to a water main, faucet, bibb, or the like. The other end has a detachable sprinkler or spray nozzle 19. One of the arms 7 is furnished with a spring clamp 16 on the end near drum 6, and one end of the hose is attached temporarily to the reel by inserting the end of the hose nearest coupling 18 between the spring clasp 16 and the drum, the clasp thus holding the end tight against the drum, with the coupling 18 abutting against the clasp. Now as the reel is rotated the hose is drawn up to it and wound on it, the clasp 18 keeping the hose from slipping off the reel. After one or two winds the friction of the hose on the reel drum 6 will hold it in place without imposing much strain on the clasp 16. After the winding is complete, as shown in Figure 2, the nozzle end of the hose will be pressed between and held by a pair of spring fingers 17 on the outer end of one of the arms 7, as shown in Figure 5, and in Figure 2, the nozzle 19 projecting beyond the clamps 17, and being supported thereby, at which time the hose is wound up in a neat compact roll.

Various mechanical devices may be utilized to rotate the reel, but the one I have shown and described is satisfactory and efficient. On the end of one of the reel journals 9 is a bevel pinion 10, which is engaged by a small bevel driving pinion 11 on the end of a horizontal shaft 12 which lies in a bearing 13 on the outside of one of the casing walls 20, the front end thereof being near the door 4, as shown in Figure 4, and passing through a hole in said door when closed, which end is preferably squared at 14 for entrance into a socket 24 on handle 15. By this crank handle the reel is rotated to wind the hose thereon. In unwinding, this is easily done after disengaging springs 17, by pulling on the nozzle-end of the hose and carrying it to the point needed for use. Further, it is observed that the bearing 13 for shaft 12 is long and has flanges 22 for securing it to wall 20. The length of bearing 13 will be substantially the thickness of wall 2, so that the bearing may be cemented or plastered in the wall solidly without interfering with the shaft 12 and its easy operation.

From the foregoing construction, operation and advantages of my stationary housed-in and storm-protected hose reel will be readily apparent. A portable reel has many objections, as I have already pointed out. A hose reel which is permanently mounted in an integral part of a building or other structure is as useful as any other built-in member of an architectural construction. For just as soon as the use of a hose is finished, the end thereof is clamped under the spring 16, and then a few turns of the crank handle 15 winds the entire hose on drum 6, as shown in Figure 2, where it is safely protected from weather-deterioration as well as theft; and also from unsightly exposure on the ground.

Many changes in the details of the embodiment may be made without varying from the invention, and I therefore reserve the right to make changes and modifications within the claim.

What I claim, is:

In a stationary hose reel, the combination with the wall of a building structure, of a casing permanently built therein and provided with a front opening having a cover, a hose reel mounted to revolve in the casing and consisting of a drum and cross arms at the ends of said drum, which arms extend beyond the ends of the drum, and which arms at their intersections carry projecting journals on which the drum revolves, a pinion on one of the drum journals, a pinion driving said first pinion, a shaft carrying the driving pinion, an elongated bearing for said shaft on the side of the casing, a crank for rotating the latter driving shaft, a clamping device on one of the arms near the drum for clamping one end of the hose, and a clamping device consisting of spring fingers on the outer end of one of the arms for holding the other end of the hose after the hose has been wound on the drum.

In testimony whereof I hereunto affix my signature.

RICHARD T. FREETH.